United States Patent
Miyazaki et al.

(10) Patent No.: US 6,956,227 B2
(45) Date of Patent: Oct. 18, 2005

(54) OBJECT DETECTING DEVICE AND METHOD WITH MEANS FOR CONTROLLING DIRECTION OF SCAN BY ELECTROMAGNETIC WAVES

(75) Inventors: Hidenori Miyazaki, Kasugai (JP); Satoru Arita, Kasugai (JP); Takashi Shirai, Kasugai (JP)

(73) Assignee: OMRON Corporation, Kyoto (JP)

( * ) Notice: Subject to any disclaimer, the term of this patent is extended or adjusted under 35 U.S.C. 154(b) by 124 days.

(21) Appl. No.: 10/678,192

(22) Filed: Oct. 3, 2003

(65) Prior Publication Data

US 2004/0065814 A1 Apr. 8, 2004

(30) Foreign Application Priority Data

Oct. 7, 2002 (JP) ........................................ 2002-293743

(51) Int. Cl.[7] .......................... G01N 21/86; G01V 8/00
(52) U.S. Cl. ................... 250/559.38; 356/4.01
(58) Field of Search ............................. 250/221, 222.1, 250/234–235, 559.38; 356/3.1, 3.11–3.12, 4.01–4.09; 180/167, 169

(56) References Cited

U.S. PATENT DOCUMENTS

| | | | | |
|---|---|---|---|---|
| 5,020,620 A | * | 6/1991 | Field | 180/169 |
| 5,745,050 A | * | 4/1998 | Nakagawa | 340/903 |
| 6,657,705 B2 | * | 12/2003 | Sano et al. | 356/4.01 |

* cited by examiner

Primary Examiner—David Porta
Assistant Examiner—Patrick J. Lee
(74) Attorney, Agent, or Firm—Beyer Weaver & Thomas LLP

(57) ABSTRACT

An object detecting device has components which emit electromagnetic waves by scanning a scan range in horizontal and vertical directions, receive reflected waves, obtain signal level of the received reflected waves, calculate a correction value based on vertical position of the zone in the scan range where the level of the received waves is the highest and the center position of the scan range in the vertical direction, and correct the center position in the vertical direction of the scan range based on the calculated correction value.

9 Claims, 10 Drawing Sheets

OBJECT DETECTING DEVICE AND METHOD WITH MEANS FOR CONTROLLING DIRECTION OF SCAN BY ELECTROMAGNETIC WAVES

This application claims priority on Japanese patent application 2002-293743 filed Oct. 7, 2002.

BACKGROUND OF THE INVENTION

This invention relates to an object detecting device and method. This invention relates more particularly to an object detecting device conveniently usable on an automobile for detecting another vehicle and a method of using such a device.

There have been known laser radars of the type to be carried on a vehicle for transmitting a laser light beam in the direction of its motion, receiving its reflected waves to thereby detect a front-running vehicle and automatically outputting an alarm signal in order to prevent a collision. In order to prevent erroneous recognition of an object by such a detecting device due to the sloping of its detection area caused by errors in the attachment of the laser radar onto the vehicle or the condition of setting on the vehicle, Japanese Patent Publication Tokkai 2000-56020 has disclosed a method of transmitting laser light widely spreading in the vertical direction firstly in a first direction and secondly at a different time in a second direction which is farther upward from the first direction and adjusting the vertical direction of the optical axis of the laser light such that the received reflected waves have the same intensity. This method requires a plurality of laser diodes because laser light must be transmitted in different vertical directions and the structure of the laser radar becomes complex. Since use is made of laser light which spreads widely in the vertical direction, furthermore, there is a high probability of misjudging the road or overpasses and road signs disposed over the road as a vehicle. Still another problem of this prior art technology was that no correction could be made in the absence of an object of detection.

SUMMARY OF THE INVENTION

It is therefore an object of this invention to make it possible with a simple structure to reliably detect an object intended to be detected.

An object detecting device of this invention may be characterized as comprising emitting means for emitting electromagnetic waves by scanning a scan range in horizontal and vertical directions, receiving means for receiving reflected waves, level obtaining means for obtaining signal level of the reflected waves received by the receiving means, calculating means for calculating a correction value (referred to as "first correction value") based on vertical position of the zone in the scan range where the level of the received waves is the highest and the center position of the scan range in the vertical direction, and correcting means for correcting the center position in the vertical direction of the scan range based on the first correction value calculated by the calculating means.

From such an object detecting device, electromagnetic waves are emitted by scanning both horizontally and vertically a certain target area of detection with a defined scan range, and as reflected waves are received, its signal level is obtained. The position of the zone in the target area of detection where the received signal level is the largest and the center position of the scan range in the vertical direction are used to calculated a correction value herein referred to as the first correction value which is for the optical axis of the emitted waves. The direction of the optical axis, or the center position of the scan range, is corrected on the basis of the calculated first correction value. As a result, the center position of the scan range in the vertical direction is corrected in the direction of the scan zone where the quantity of reflected electromagnetic waves such as light is the largest. Thus, an object can be detected in a dependable manner. The functions of the level obtaining means the calculating means and the correcting means can be effected by carrying out specified programs.

The object detecting device of this invention may further comprise a storing means (which may also be referred to as the first storing means) for storing the first correction value for each scan of the scan range, and the calculating means may serve to calculate a next one of first correction values (the next first correction value) according to a previous one the first correction values (the previous first correction value) calculated previously by the calculating means and stored in the first memory means.

If the difference between the previous first correction value stored in the first memory means and the next first correction value is equal to or greater than a specified value, the calculating means may be adapted to set the next first correction value as being equal to the sum of the previous first correction value and the specified value. This is such that effects of instantaneous deviations of the optical axis on the correction value can be controlled. The first storing means may comprise a memory device or any memory holding device such as a hard disk capable of storing data even if power goes off.

The object detecting device of this invention may further comprise a histogram storing means for storing a histogram of first correction values calculated by the calculating means and frequency numbers of corrections effected by the correcting means such that, when the first correction value calculated by the calculating means satisfies specified conditions, one is added to the frequency number in the histogram corresponding to the first correction value calculated by the calculating means. If the object detecting device of this invention is installed on a vehicle (referred to as the own vehicle) such as an automobile and the electromagnetic waves are emitted forward towards a front-running vehicle, these specified conditions may include that the distance between the own vehicle and the object in front such as the front-running vehicle as measured thereby be within a specified range, that the absolute value of the first correction value be less than a specified maximum value and that the speed of the own vehicle be greater than a specified minimum speed.

The object detecting device of this invention may still further comprise a judging means (referred to as the first judging means) for judging whether a target object of detection was detected or not, another judging means (referred to as the second judging means) for judging, when it is judged by the first judging means that the target object of detection is not detected, whether data number of the aforementioned histogram is larger than a predetermined standard data number or not, and setting means for setting the first correction value of the histogram having the largest frequency number as second correction number, when the second judging means judges that the data number of the histogram is larger than the standard data number such that the correcting means corrects the center position in the vertical direction of the scan range based further on the second correction value. In this manner, the deviation of the center position of the scan range (also referred to as the optical axis) can be corrected even in the absence of an object to be detected. The aforementioned first judging means, second judging means and setting means may be realized by a control circuit adapted to carry out a program. The histogram storing means may comprise a memory device or any memory holding device such as a hard disk capable of storing data even if power goes off.

The object detecting device of this invention may further comprise another storing means (referred to as the second storing means) for storing the aforementioned second correction value and still another judging means (referred to as the third judging means) for judging whether or not the second storing means is storing the second correction value such that the correcting means corrects the center position in the vertical direction of the scan range (or the optical axis) based on the second correction value if the third judging means judges that the second storing means is storing the second correction value. If the third judging means judges that the second storing means is not storing the second correction value, the correcting means may correct the center position in the vertical direction of the scan range based on a preliminarily specified standard value.

In this manner, even if the data number of the histogram is relatively small but if there are previously determined correction values obtained from the histogram, a correction can be carried out on the basis thereof. Even if there is no previously determined correction value based on the histogram, a correction can be carried out on the basis of a preliminarily specified standard value.

The third judging means may also be realized by a control circuit adapted to carry out a program. The second storing means, too, may comprise a memory device or any memory holding device such as a hard disk capable of storing data even if power goes off.

A method of detecting an object according to this invention may be characterized as comprising the steps of emitting electromagnetic waves by scanning a scan range in horizontal and vertical directions, receiving reflected electromagnetic waves, obtaining level of reflected waves received in the aforementioned wave-receiving step, calculating a first correction value based on vertical position of the zone in the scan range where the level of the received waves is the highest and the center position of the scan range in the vertical direction, and correcting the center position in the vertical direction of the scan range based on the first correction value calculated in the aforementioned calculation step. Thus, as explained above regarding an object detecting device embodying this invention, the center position of the scan range (or the optical axis of the emitted waves) in the vertical direction is adjusted towards the zone where the level of the reflected waves is the highest and hence an object in front can be detected in a dependable manner.

The step of emitting electromagnetic waves may be carried out in response to a signal from a control circuit. The step of obtaining a level of received waves may be carried out on the basis of a signal outputted from a photodiode which receives the reflected waves and by using a light receiver circuit to process the signal level to be inputted to the control circuit. The calculating step may be carried out by the control circuit adapted to calculate a correction value for a short-term deviation of the optical axis (defining the center position of the scan range) on the basis of vertical position of the zone in the scan position where the signal level of the reflected waves is the highest and the current center position of the scan range (or the direction of the optical axis) in the vertical direction. The correcting step may be carried out by the control circuit which is also adapted to correct the center position of the scan range (or the direction of the optical axis) on the basis of the correction value for short-term deviation of the optical axis.

It is to be noted that throughout herein, the term "optical axis" is used to indicate the direction of the center position of the scan range scanned by the device and not the direction of the physical device itself.

BRIEF DESCRIPTION OF THE DRAWINGS

FIGS. 7-1 and 7-2, together referred to as FIG. 7, are a flowchart for the process by the control circuit of FIG. 2 to correct the vertical optical axis.

DETAILED DESCRIPTION OF THE INVENTION

Figure 1:
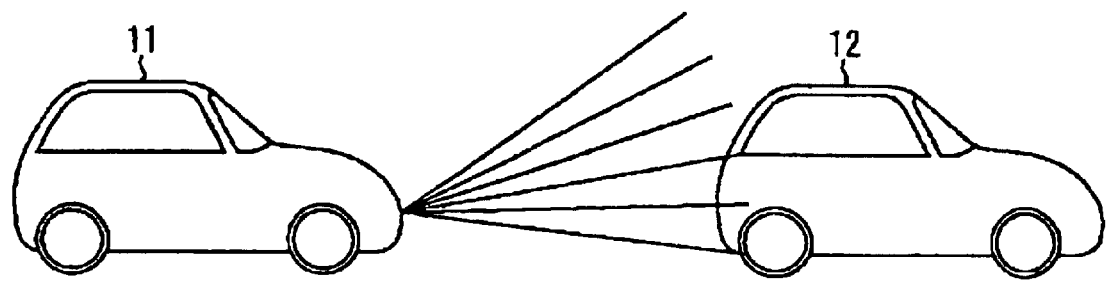
FIG. 1 is a schematic drawing for showing the manner of using an example of laser radar system embodying this invention for a vehicle.

The invention is described next by way of an example with reference to drawings. FIG. 1 is a schematic drawing for showing the manner of using an example of laser radar system embodying this invention for a vehicle, illustrating a vehicle 11 transmitting laser light towards another vehicle 12 and estimating the distance therebetween from the reflected light from the other vehicle 12.

Figure 2:
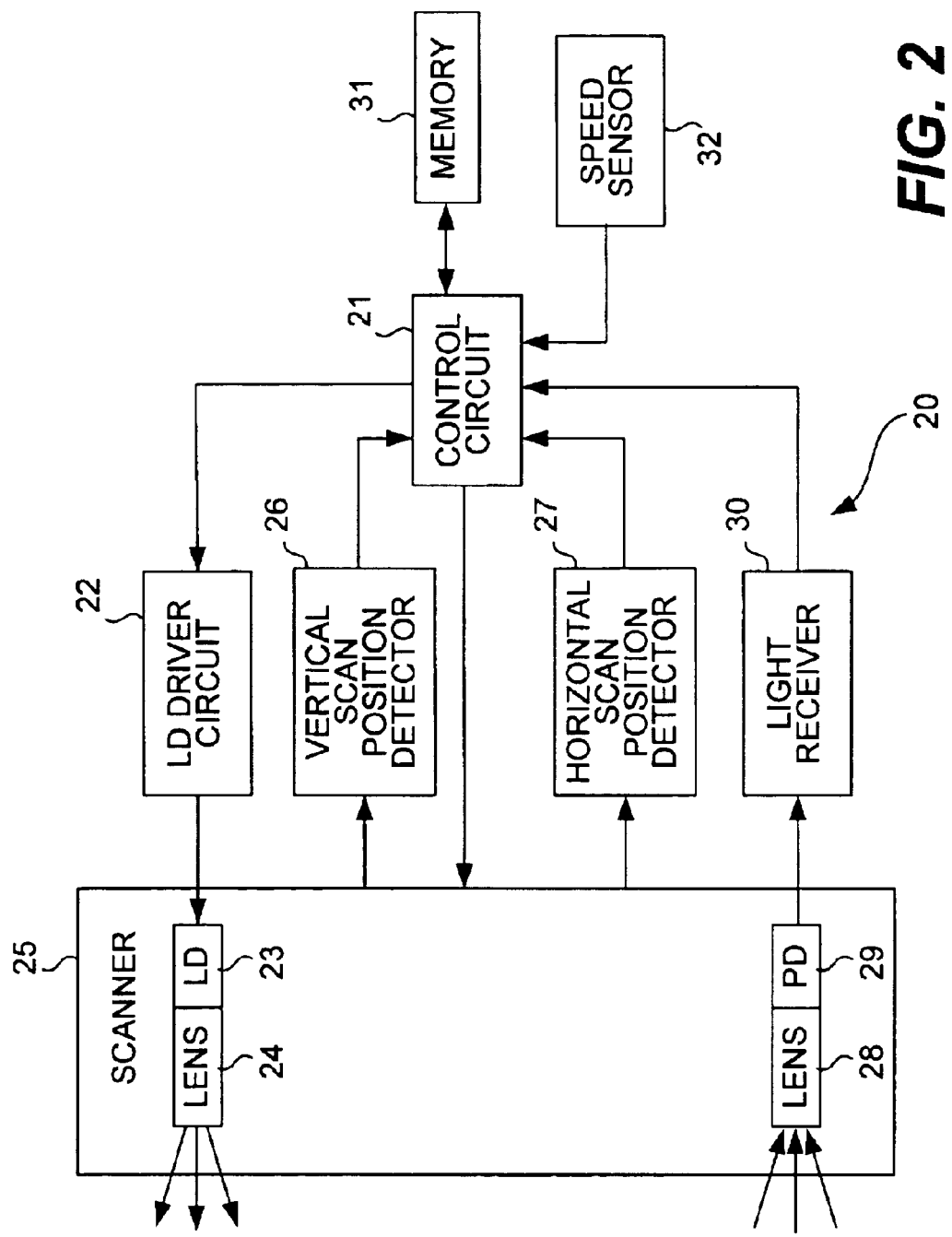
FIG. 2 is a block diagram for showing the structure of the laser radar of FIG. 1.

FIG. 2 is a block diagram for showing the structure of a laser radar 20 serving as a distance detector installed on the vehicle 11. A laser diode (LD) driver circuit 22 controls the light emission from an laser diode (LD) 23 on the basis of a drive signal generated by a control circuit 21. A scanner 25 serves to scan a specified scan area with laser light generated by the LD 23. The laser light emitted from the scanner 25 is transmitted in the direction of motion (to the right in FIG. 1) of the vehicle 11 through a transmission lens 24. A vertical scan position detector 26 and a horizontal scan position detector 27 serve to detect the scan position respectively in the vertical and horizontal directions and outputs the detection results to the control circuit 21.

The laser light emitted by the LD 23 and reflected back by a target object of detection (such as a vehicle) is collected by a reception lens 28 and received by a photodiode (PD) 29, a signal corresponding to the level of received light being outputted to a light receiver circuit 30. The light receiver circuit 30 converts the inputted signal level of the reflected light into a number and outputs it to the control circuit 21. The control circuit 21 stores the inputted number (the level of received light) in a memory 31 corresponding to the scan position inputted from the vertical and horizontal scan position detectors 26 and 27. The memory 31 also serves to store the value of optical axis displacement correction and a histogram (as later referred to in FIG. 9). Numeral 32 indicates a vehicle speed sensor for detecting the speed of the vehicle 11 (or the "own vehicle" on which the laser radar 20 is installed) and outputting it to the control circuit 21. The cpntrol circuit 21 serves to correct the optical axis (at the center position of the vertical range of scan) and to measure the distance between a front-running vehicle and the own vehicle (on which it is installed) on the basis of the time it has taken for the laser light to be emitted, reflected and received. For reasons that will become clear from the descriptions given below, the control circuit 21 is hereinafter conveniently also referred to as judging (first, second and third) and setting means.

Figure 3:
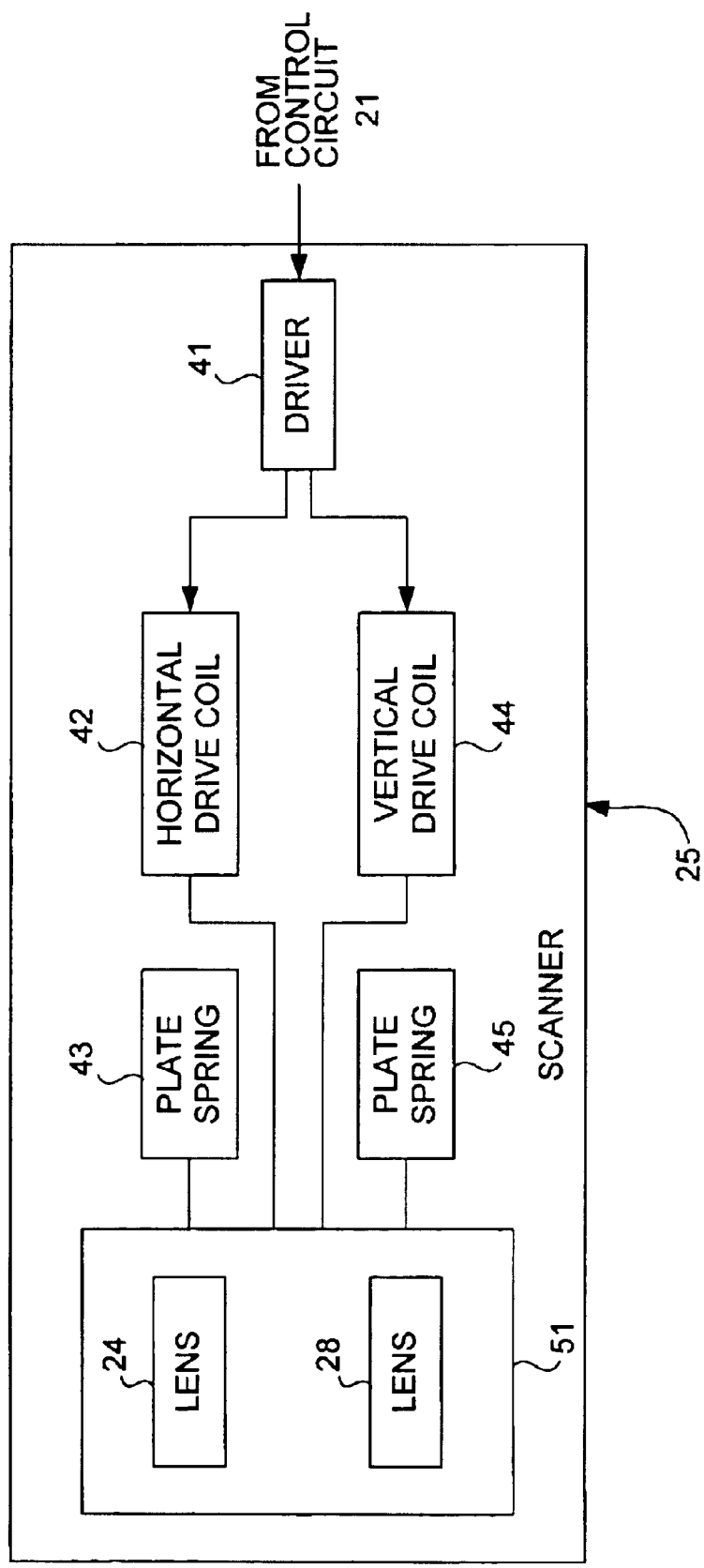
FIG. 3 is a block diagram for showing the support structure of the transmission lens and the reception lens of FIG. 2.

FIG. 3 shows the structure of the part of the scanner which supports its transmission lens 24 and reception lens 28. The control signal outputted from the control circuit 21 is inputted to a driver circuit 41. On the basis of this inputted control signal, the driver circuit 41 supplies drive currents to a horizontally driving coil 42 and a vertically driving coil 44 which serve to move respectively horizontally and vertically a supporting member 51 that supports the transmission lens 24 and the reception lens 28 integrally. The supporting member 51 is also supported by a horizontal plate spring 43 and a vertical plate spring 45 so as to be freely movable in the horizontal direction and in the vertical direction, respectively. Thus, the supporting member 51 (with the transmission lens 24 and the reception lens 28) moves to and stops at the horizontal position where the force generated in the drive coil 42 for horizontal motion by a drive current and the reaction force generated in the horizontal plate spring 43 are balanced and also moves to and stops at the vertical position where the force generated in the drive coil 44 for vertical motion and the reaction force generated in the vertical plate spring 45 are balanced. Thus, the transmission lens 24 and the reception lens 28 can be moved both horizontally and vertically to any specified position.

Figure 4:
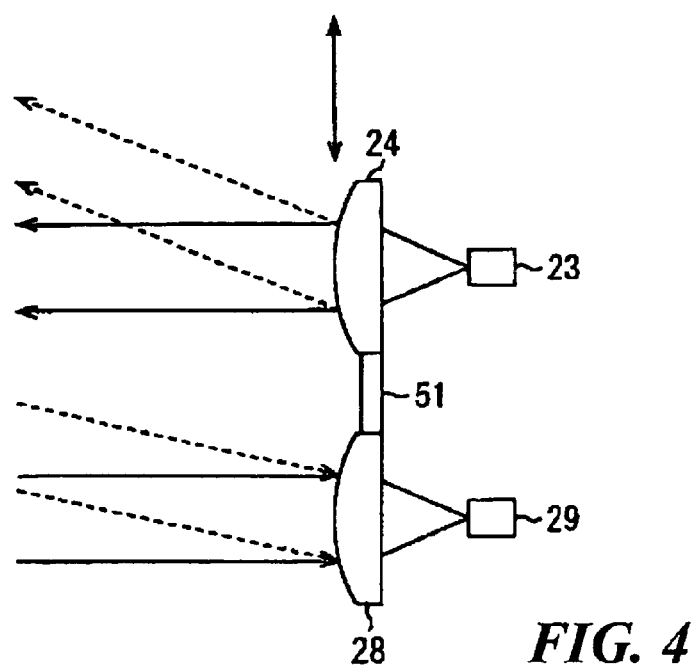
FIG. 4 is a diagram for showing the path of laser light from the laser radar of FIG. 2.

FIG. 4 shows the travel paths of light through the transmission lens 24 and the reception lens 28 driven by the scanner 25. The transmission lens 24 is disposed in front of the LD 23 and the reception lens 28 is disposed in front of the PD 29. The laser light emitted from the LD 23 is deflected towards the center of the transmission lens 24. If the optical axis of the transmission lens 24 is collinear with the optical axis of the scanner, the light path is as shown by solid lines in FIG. 4 and the laser light is transmitted straight forward in the frontal direction. If it is reflected by a target object of detection such as the vehicle 12 in front, the reflected light is received by the reception lens 28 as shown by solid lines in FIG. 4.

If the transmission lens 24 is moved upward with reference to FIG. 4 by means of the scanner 25, the laser light will be emitted in an upward direction and the reflected light will be received by the PD 29 through the reception lens 28 as shown by broken lines in FIG. 4. Thus, the scanner 25 serves to move the transmission and reception lenses 24 and 28 horizontally and vertically in an integrated manner, thereby deflecting the laser light and scanning a detection area both in the horizontal and vertical directions.

Figure 5:
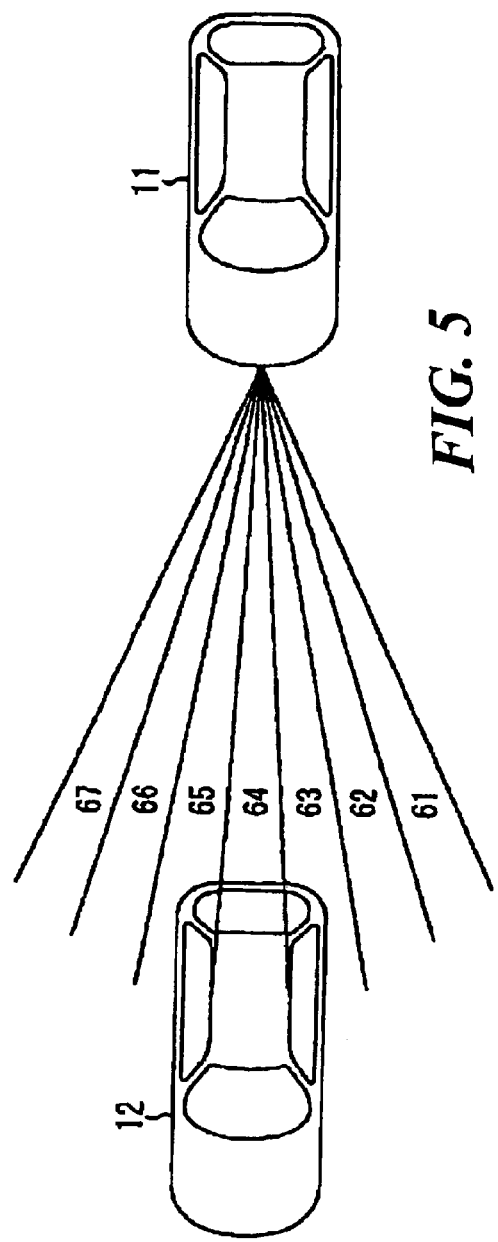
FIG. 5 is a diagram for showing the area of detection of the laser radar of FIG. 2 within a horizontal plane.
Figure 6:
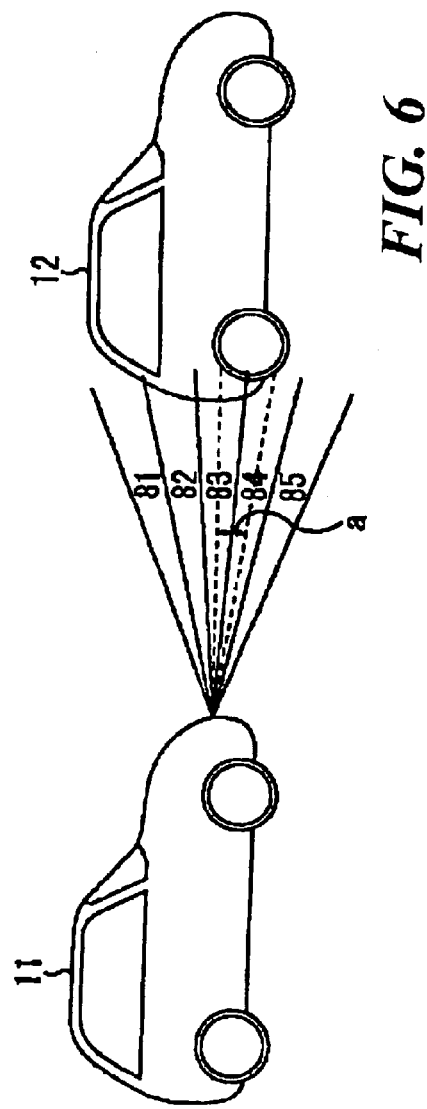
FIG. 6 is a diagram for showing the area of detection of the laser radar of FIG. 2 within a vertical plane.

FIGS. 5 and 6 show an example of ranges of horizontal and vertical scans when laser light is emitted from the vehicle 11 towards the front-running vehicle 12 of FIG. 1. According to the example shown in FIGS. 5 and 6, the range of horizontal scan is divided into seven zones 61–67 and the range of vertical scan is divided into five zones 81–85. Table 1 shows the scan direction by the scanner 25 (to the left←or to the right→) when the zones shown in FIGS. 5 and 6 are scanned by the laser light. Vertical zone 83 is the center zone in the vertical direction. In this zone, the horizontal scan is effected from horizontal zone 61 to horizontal zone 67 ("main scan"). In the other vertical zones 81, 82, 84 and 85 above and below the center vertical zone 83, the horizontal scan is effected from horizontal zone 67 to horizontal zone 61 ("subscan 1, 2, 3 and 4").

TABLE 1

| Zones | 61 | 62 | 63 | 64 | 65 | 66 | 67 | Name |
|---|---|---|---|---|---|---|---|---|
| 81 | ← | ← | ← | ← | ← | ← | ← | Subscan 1 |
| 82 | ← | ← | ← | ← | ← | ← | ← | Subscan 2 |
| 83 | → | → | → | → | → | → | → | Main scan 1 |
| 84 | ← | ← | ← | ← | ← | ← | ← | Subscan 3 |
| 85 | ← | ← | ← | ← | ← | ← | ← | Subscan 4 |

Table 2 shows the sequence in which main scan 1 and subscans 1–4 are effected when the entire target area of detection is scanned. In Step 1, the scanner 25 carries out subscan 1. In Steps 2–8, subsequently, subscan 1, main scan 1, subscan 2, main scan 1, subscan 3, main scan 1 and subscan 4 are respectively carried out. The time of each scan is 50 ms, and the eight scans by Steps 1–8 are together referred to as one set of scans.

TABLE 2

| Sequence | Scan type | Scan time |
|---|---|---|
| S1 | Main scan 1 | 50 ms |
| S2 | Subscan 1 | 50 ms |
| S3 | Main scan 1 | 50 ms |
| S4 | Subscan 2 | 50 ms |
| S5 | Main scan 1 | 50 ms |
| S6 | Subscan 3 | 50 ms |
| S7 | Main scan 1 | 50 ms |
| S8 | Subscan 4 | 50 ms |

According to this invention, deviations of the optical axis of the laser radar 20 are corrected both on a short-term basis and on a long-term basis. Short-term deviations of the optical axis include those lasting for only a few seconds due, for example, to the vertical swinging motion of its own vehicle (on which it is installed) at the time of its acceleration and deceleration and the vertical motion of the front-running vehicle going over a slope. Long-terms deviations of the optical axis may be due to the sloping of its own vehicle caused by a change in the weight of its load or a light collision. There are also instantaneous deviations due, for example, to an instantaneous swinging motion of its own vehicle in the vertical direction due to a rough road surface condition, but such instantaneous deviations of the optical axis will not be corrected according to this invention.

Figures 1, 7:
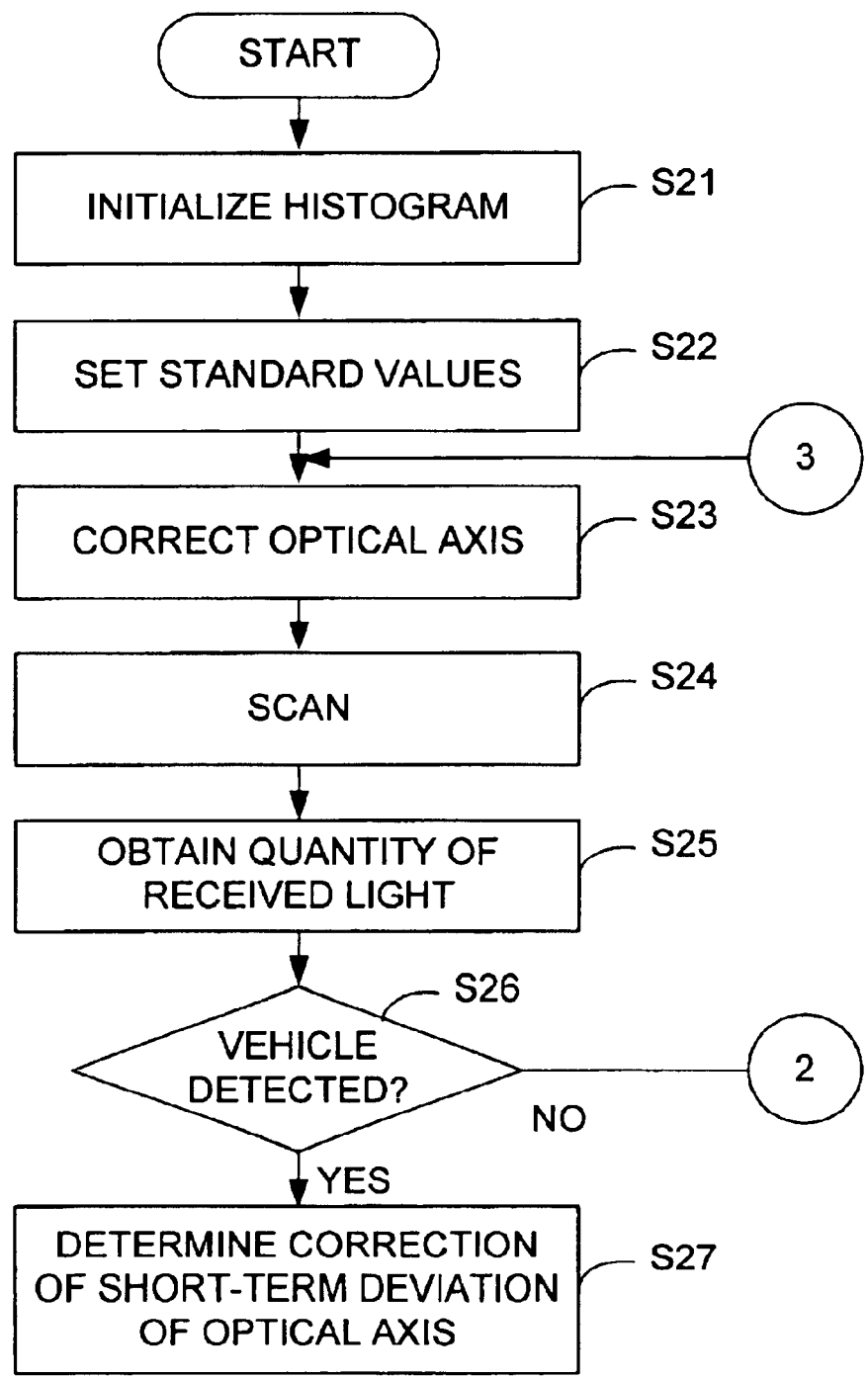
Figures 2, 7:
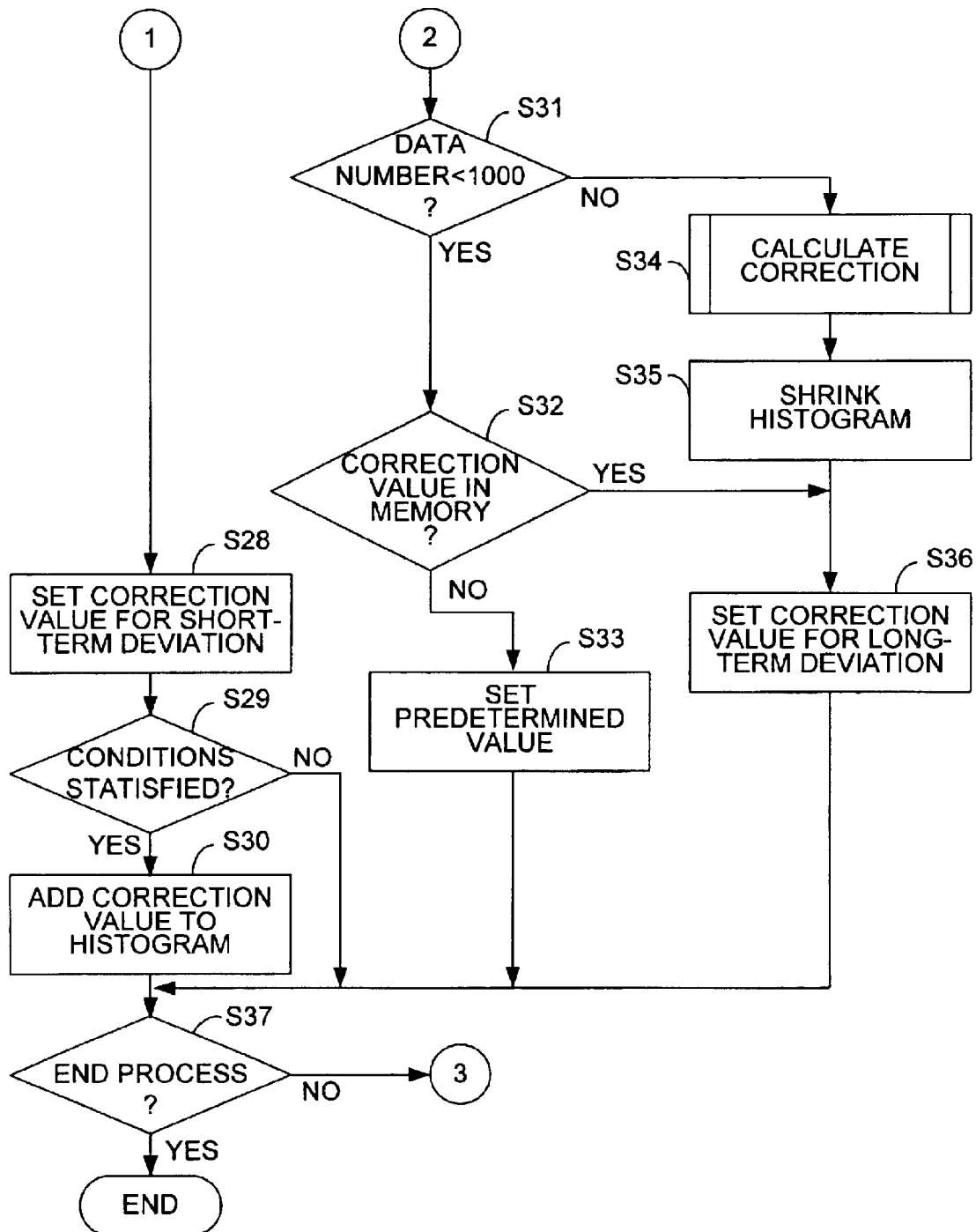
Figure 8:
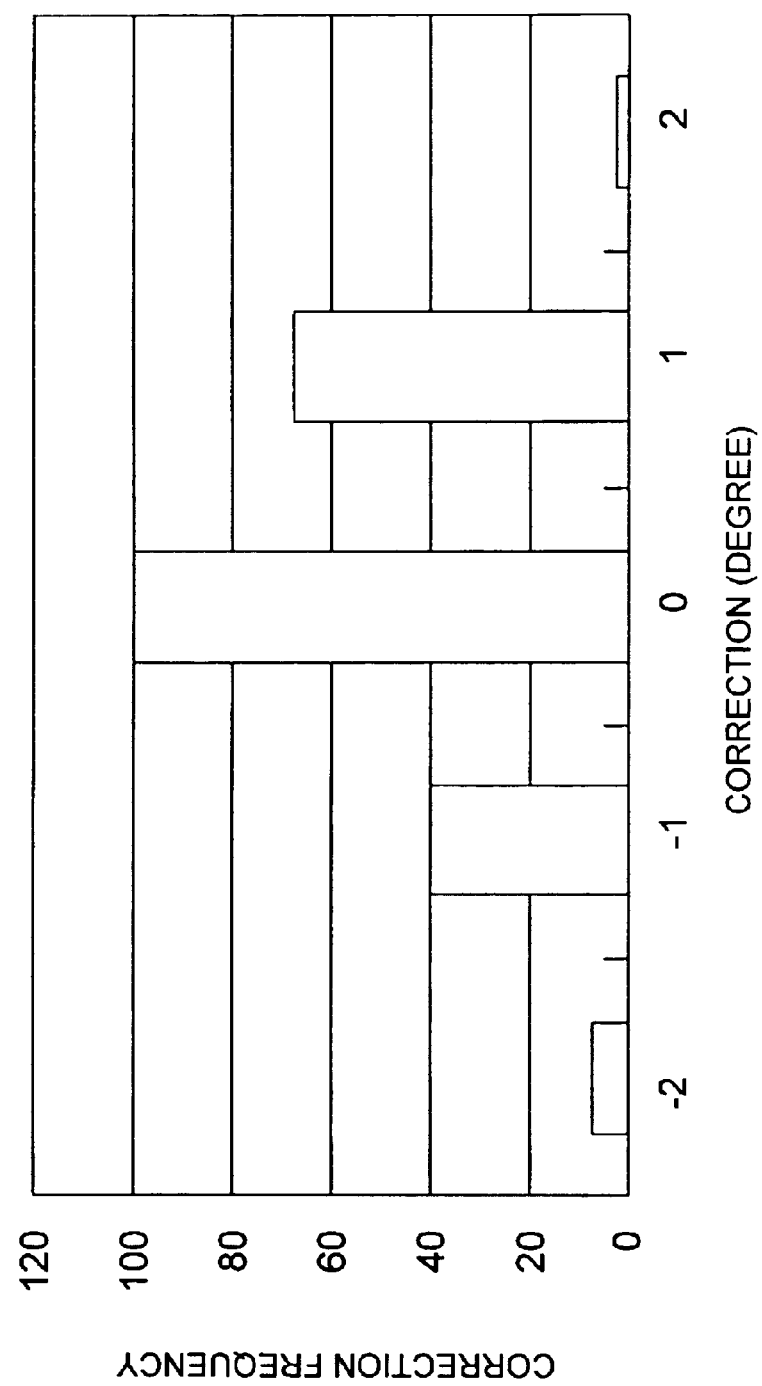
FIG. 8 is an example of histogram of correction of the optical axis and frequency of corrections.

FIG. 7 is a flowchart for the process of correcting a vertical deviation of the optical axis by the control circuit 21. In Step S21, the control circuit 21 initializes the histogram (to be explained below with reference to Step S30) now stored in its memory 31. FIG. 8 shows how such a histogram may appear, showing the quantity of correction along the horizontal axis and the frequency number (or the number of times) of corrections along the vertical axis. The example shown in FIG. 8 indicates that a correction of the optical axis by −2° has been carried out 8 times and that by −1° has been carried out 40 times. The number of times no optical axis correction was effected is at a maximum of 100. A correction of the optical axis by +1° has been carried out 70 times and that by +2° has been carried out a minimum number of times of 2. In the initialization of Step S21, these frequency numbers are all reset to zero.

In Step S22, the control circuit 21 sets the standard value preliminarily determined at the time of the shipment from the factory as the correction value for the optical axis. This standard value is also stored in the memory 31. In Step S23, the control circuit 21 controls the scanner 25 to correct the optical axis according to the set quantity for the correction. This is done by a control signal transmitted from the control circuit 21 to the driver circuit 41 of the scanner 25 as explained above with reference to FIG. 3 and a current corresponding to this control signal is supplied to the vertically driving coil 44. The vertical plate spring 45 connected to the supporting member 51 supporting the transmission and reception lenses 24 and 28 is thereby shifted to the position at which the force generated in the coil by the supplied current and the reaction force generated in the plate spring balance each other. In this manner, the vertical position of the target area of detection is set equal to the position at the time of shipment from the factory.

An example of operations for setting the center position of the scan area in the vertical direction (also referred to as the vertical direction of the scan area) is explained next with reference to FIGS. 9–11. In this example, the movable range of the scanner 25 is 8° and the vertical range of the scan is 4° out of these 8°.

Figure 9:
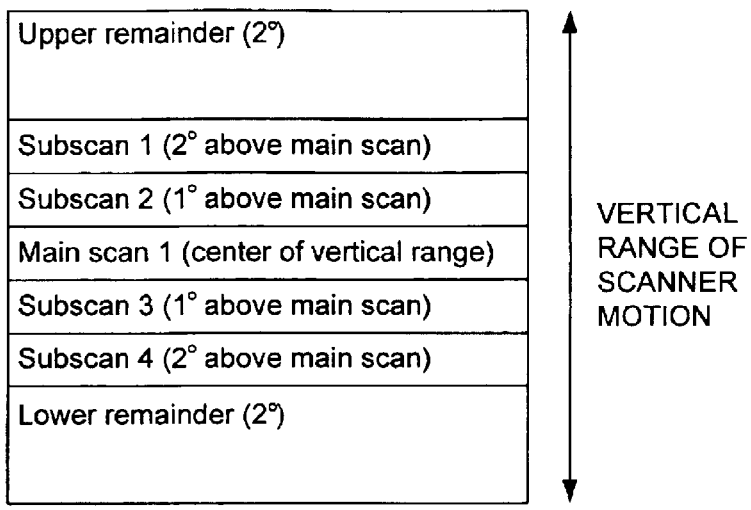
FIGS. 9–11 are each an example of areas scanned by the scanner of FIG. 2.

FIG. 9 shows an example of vertical position of the scan area when the correction of the optical axis is 0°, or when there is no correction. In this situation, main scan 1 is set at the center of the vertical range of motion. Subscan 2 is set above main scan 1 by 1° and subscan 1 is set further upward by 1°, or above main scan 1 by 2°. Subscan 3 is set below main scan 1 by 1° and subscan 4 is set further downward by 1°, or below main scan 1 by 2°. Accordingly, there are remainders of 2° both above and below. This is set in Step S22 as the standard value.

Figure 10:
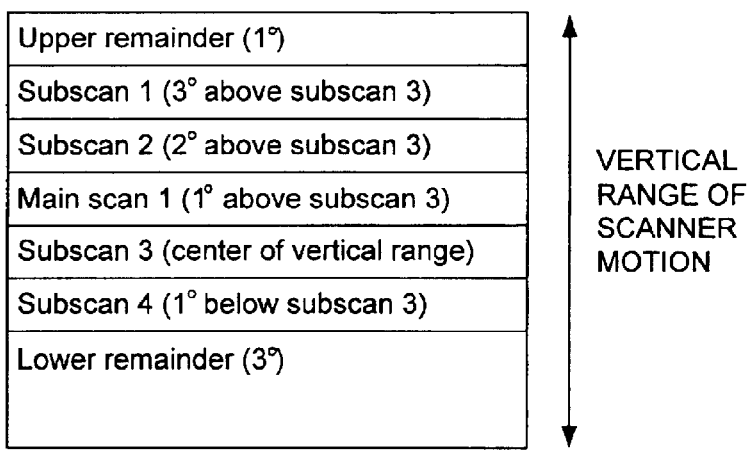

FIG. 10 shows an example of vertical position of the scan area set by the scanner 25 when the correction of the optical axis is by 1° in the upward direction. In this situation, main scan 1 is set at an upward direction above the center of the vertical motion by 1°. As in FIG. 9, subscan 2 is set above main scan 1 by 1° and subscan 1 is set further upward by 1°, Subscan 3 is set below main scan 1 by 1° and subscan 4 is set further downward by 1°. Accordingly, there are remainders of 1° and 3° respectively above and below.

Figure 11:
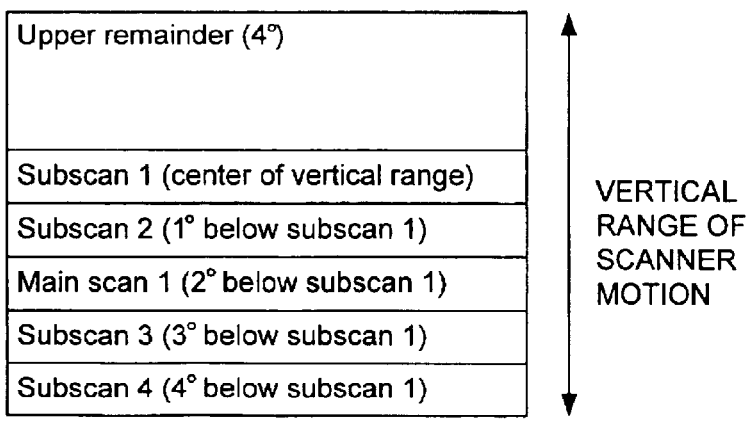

FIG. 11 shows an example of vertical position of the scan area set by the scanner 25 when the correction of the optical axis is by 2° in the downward direction. In this situation, main scan 1 is set at a downward direction below the center of the vertical motion by 2°. Subscan 2 is set above main scan 1 by 1° and subscan 1 is set further upward by 1°. Subscan 3 is set below main scan 1 by 1° and subscan 4 is set further downward by 1°. Accordingly, there is a remainder of 4° on the upper side but there is no remainder on the lower side.

In Step S24, the control circuit 21 controls the scanner 25 and carries out one set of scanning over the specified scan area by the method and in the order shown in Tables 1 and 2. The emitted laser light is reflected by an object in the target area of scan and received by the PD 29. The received light is subjected to photoelectric conversion by the PD 29 and is further converted into a numerical signal by the light receiver circuit 30. In Step S25, the control circuit 21 obtains the quantity of received light (or the received light level) expressed in a numerical form.

Table 3 shows an example of the quantities of received light obtained in Step S25. In this example, the quantity of received light (in the numerical form as explained above) is 10 from horizontal zone 64 in vertical zone 81. In vertical zone 82, it is 20, 100 and 25 respectively from horizontal zones 63, 64 and 65. In vertical zone 83, it is 90, 150 and 100 respectively from horizontal zones 63, 64 and 65. In vertical zone 84, it is 150, 200 and 160 respectively from horizontal zones 63, 64 and 65. In vertical zone 85, it is 80, 180 and 75 respectively from horizontal zones 63, 64 and 65.

TABLE 3

| Vertical zones | Horizontal zones | | | | | | | Scan |
|---|---|---|---|---|---|---|---|---|
| | 61 | 62 | 63 | 64 | 65 | 66 | 67 | |
| 81 | 0 | 0 | 0 | 10 | 0 | 0 | 0 | Subscan 1 |
| 82 | 0 | 0 | 20 | 100 | 25 | 0 | 0 | Subscan 2 |
| 83 | 0 | 0 | 90 | 150 | 100 | 0 | 0 | Main scan 1 |
| 84 | 0 | 0 | 150 | 200 | 160 | 0 | 0 | Subscan 3 |
| 85 | 0 | 0 | 80 | 180 | 75 | 0 | 0 | Subscan 4 |

In Step 26, the control circuit 21 determines whether a front-running vehicle has been detected or not. For example, if the maximum quantity of received light ("200" in the example of Table 3) from any zone is equal to or greater than the preliminarily specified standard value, it is determined that a front-running vehicle has been detected. If it is determined that a front-running vehicle has been detected, the control circuit 21 proceeds to Step S27 to carry out a process for determining the amount of correction of a short-term deviation of the optical axis. This process will be described next in detail with reference to FIG. 12.

In Step S51, the control circuit 21 identifies the vertical zone in which a maximum quantity of light is received. In the example of Table 3, it is clearly vertical zone 84 that received a largest quantity of light. In Step S52, the control circuit 21 calculates as the angular deviation of the optical axis the offset angle of the vertical zone with a maximum quantity of received light from the center of the range of vertical motion of the scanner 25. In the example of Table 3, since main scan 1 is set to vertical zone 83, its angle (a as shown in FIG. 6) with the center of vertical zone 84 with the maximum quantity of received light becomes 1°.

Figure 13:
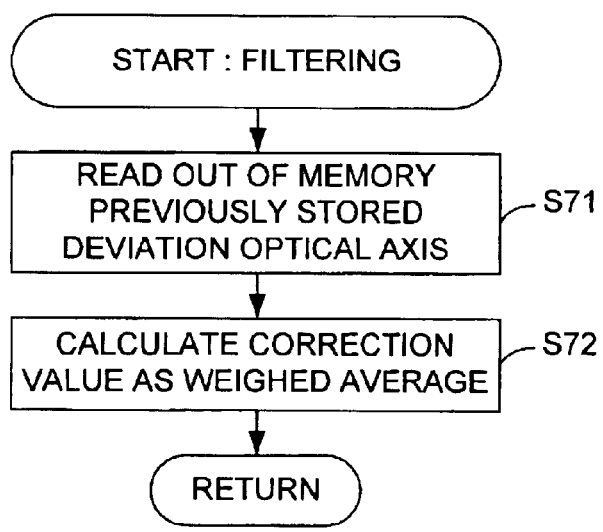
FIG. 13 is a flowchart of the filtering process in Step 53 of FIG. 12.

In Step S53, the control circuit 21 carries out a filtering process according to the flowchart shown in FIG. 13. In Step S71 of FIG. 13, the control circuit 21 reads out of the memory 31 the previously stored correction value for a short-term deviation of the optical axis. In Step S72, the control circuit 21 calculates the sum of 80% of the previous correction value thus read out and 20% of the currently obtained deviation of the optical axis and sets this weighed average as the current correction value. If the previously obtained correction value was 2° and the currently calculated deviation value is 1°, the current correction value is calculated as 0.8×2°+0.2×1°=1.8°.

Figure 14:
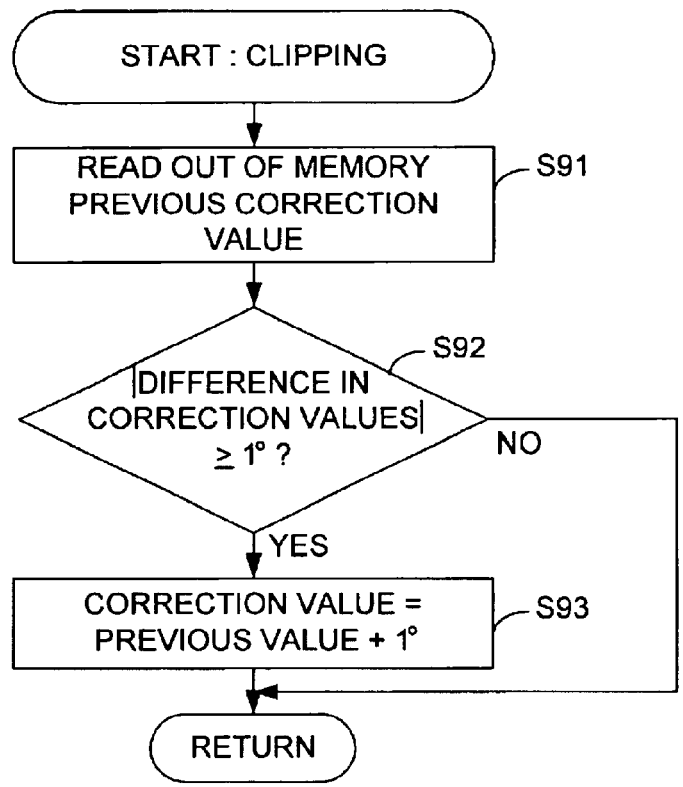
FIG. 14 is a flowchart of the clipping process in Step 54 of FIG. 12.

After the processing of Step S72 is completed, the control circuit 21 carries out a clipping process (Step S54 of FIG. 12) according to the flowchart shown in FIG. 14. In Step S91 of FIG. 14, the control circuit 21 reads out of the memory 31 the previously stored amount of correction value for a short-term deviation of the optical axis (stored in Step S55 to be explained below in the previous cycle). In Step S92, the control circuit 21 determines whether or not the absolute value of the difference between the currently set correction value for a short-term deviation of the optical axis (which was set in Step S72 of FIG. 13) and the previously set correction value is equal to or greater than 1°. If it is determined to be equal to or greater than 1°, the control circuit 21 proceeds to Step S93 and sets the current correction value for a short-term deviation of the optical value equal to the value obtained by adding 1° to the previous correction value for the deviation of the optical axis. In other words, the previous correction value is not increased by more than 1° to obtain the current correction value.

If it is determined in Step S92 of FIG. 14 that the absolute value of the difference between the currently and previously set correction values is less than 1°, the control circuit 21 does not change the correction value for the short-term deviation of the optical axis and keeps the previous value.

Figure 12:
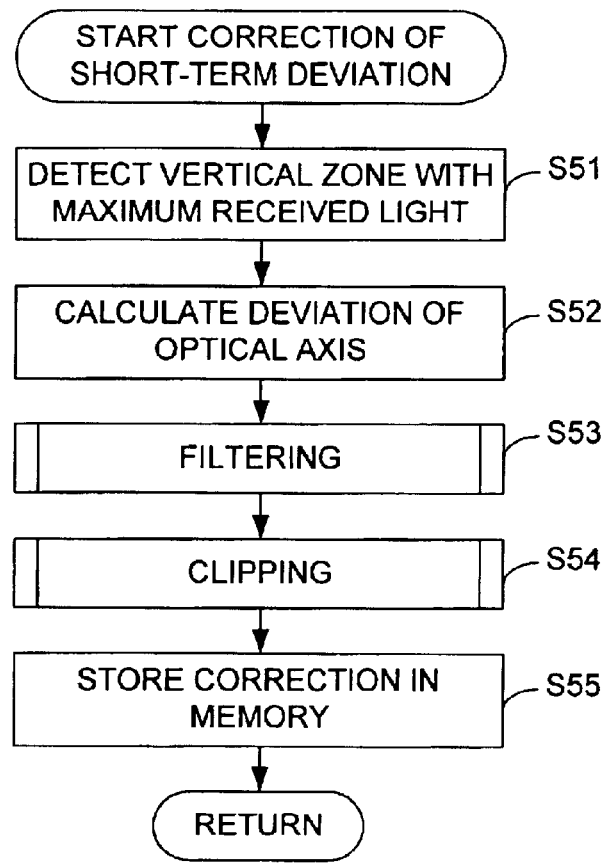
FIG. 12 is a flowchart of the process in Step S27 of FIG. 7-1.

After the processing of Step S93 or if it is determined in Step S92 of FIG. 14 that the absolute value of the difference between the currently and previously set correction values is less than 1°, the control circuit 21 proceeds to Step S55 of FIG. 12 and stores the current correction value for the short-term deviation of the optical axis in the memory 31.

After the processing of Step S55, the control circuit 55 proceeds to Step 28 of FIGS. 7-2 and reads out the correction value stored in the memory 31 to set it as the correction value such that, when the processing returns from Step S37 to Step 23, the position in the vertical direction of the scan range is corrected on the basis of this set correction value for the optical axis. In Step S29, the control circuit determines whether or not the correction value satisfies conditions for inclusion into statistics (to be described below) for the histogram.

One of the conditions is that the distance to the front-running vehicle be between 30 m and 100 m. If the measured distance satisfies this condition, it may be concluded that the own vehicle is following the front-running vehicle at a constant distance. Another condition is that the absolute value of the correction value be less than 2°. This condition is for the purpose of eliminating the effects of instantaneous deviations of the optical axis, as explained above. A third condition is that the speed of the own vehicle be 60 km/h or faster. This is because the time duration of deviation of the optical axis due to a sloping road becomes longer when the own vehicle is stationary or moving at a low speed and is for the purpose of using the device mainly on roads with smaller slopes or on highways or reducing the effects of short-term deviations of the optical axis.

If it is determined in Step S29 that all of the conditions set out above for the inclusion in statistics are satisfied, the control circuit 21 proceeds to Step S30 and adds the newly obtained correction value in the histogram such as shown in FIG. 8 stored in the memory 31. If the newly obtained correction value is −1°, for example, the frequency of correction by −1° in the histogram of FIG. 8 will be updated from 40 to 41. If even one of the conditions set out above is not satisfied, on the other hand, the process of Step S30 described above is not carried out and Step S30 is skipped. In other words, the newly obtained correction value is not added to the histogram. This is for the purpose of preventing instantaneous and short-term deviations of the optical axis to adversely and undesirably affect the long-term deviation of the optical axis to be described below.

If it is determined in Step S26 that no front-running vehicle is detected, for example, because the maximum quantity of received light from a zone is smaller than the standard value, the control circuit 21 proceeds to Step S31 and determines whether the number of data included in the histogram is less than 1000 or not. If the data number of the histogram is found to be less than 1000, the control circuit 21 proceeds to Step S32 and determines whether or not a frequency number of corrections for long-term deviations of the optical axis is stored in the memory 31 (by the process in Step S113 to be described below). If it is determined that no such number is stored in the memory 31, the control circuit 21 proceeds to Step S33 and sets a preliminarily specified standard value stored in the memory 21 as correction value.

Figure 15:
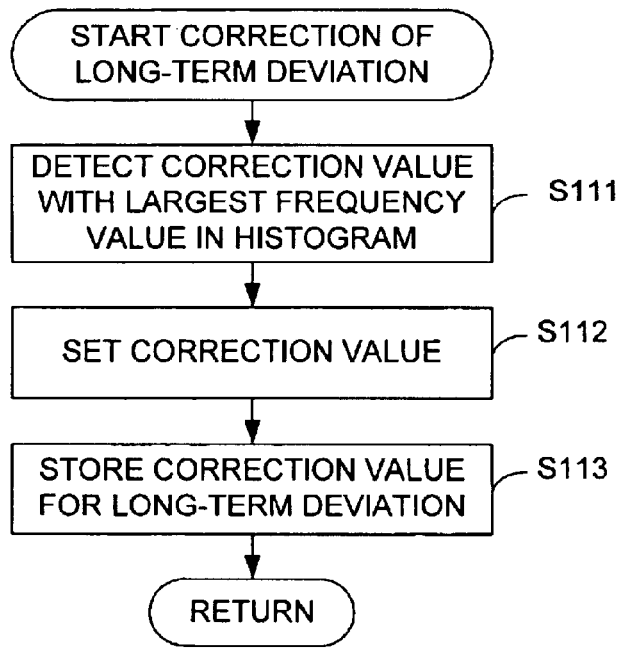
FIG. 15 is a flowchart of the process in Step S34 of FIG. 7-2.

If it is determined in Step S31 that the number of data included in the histogram is 1000 or larger, the control circuit proceeds to Step S34 and calculates the correction value for long-term deviation of the optical axis according to the flowchart shown in FIG. 15.

In Step S111 of FIG. 15, the control circuit 21 detects the correction number corresponding to the largest frequency number in the histogram. If the histogram is as shown in FIG. 8, the correction value 0° for the deviation of the optical axis is detected corresponding to the maximum frequency number of 100. In Step S112, the control circuit 21 sets this correction value (0° in this example) as the correction value for long-term deviation of the optical axis. In Step S113, the control circuit 21 stores this value in the memory 31.

Thereafter, the control circuit 21 proceeds to Step S35 of FIGS. 7-2 and shrinks the histogram by reducing its data number by 50%. This may be done by reducing the frequency number corresponding to each correction number by 50%. After the processing of Step S35 or if it is determined in Step S32 that correction values for long-term deviations of the optical axis are stored in the memory 31, the control circuit 21 proceeds to Step S36 and sets the correction value for long-term deviation as the correction value for the optical axis. In other words, either the newly obtained correction value for long-term deviation in Step S113 or the correction value for long-term deviation stored in the memory 31 is set as the correction value for the optical axis.

Thus, after 1000 correction values are added to the histogram by the processing of Step S30 and a correction value for long-term deviation of the optical axis is set in Step S34, the control circuit 21 carries out the processing of Steps S34–S36 every time 500 new data items are added by the process of Step S30, thereby determining a new correction value for long-term deviation and setting it as the correction value for the deviation of optical axis.

If it is determined in Step S29 that the conditions for the statistics are not satisfied, the control circuit 21 proceeds to Step S37 after the processing of Step S30, S33 or S36 and determines according to a command of the user whether or not the processing with the laser radar should be terminated. If it is determined that the processing by the laser radar has not been completed, the control circuit 21 returns to Step S23 and corrects the optical axis on the basis of the correction value which has been set. This is to say, if a front-running vehicle has been detected, that the optical axis is corrected on the basis of the correction value for short-term deviation of the optical axis and, if the front-running vehicle has not been detected and the data number for the histogram is 1000 or greater, that the optical axis is corrected on the basis of the correction value for long-term deviation. In the case where the front-running vehicle has not been detected and the data number for the histogram is less than 1000, the optical axis is corrected on the basis of a standard value if the previous correction value for long-term deviation of the optical axis is found stored in the memory 31. If the previous correction value for long-term deviation of the optical axis is found stored in the memory 31, the optical axis is corrected on the basis thereof. The processes described above are repeated until a command is received to end the processing. If it is detected in Step S37 that the processing of the laser radar is to be ended, the control circuit 21 responds by ending the process.

In summary, since the optical axis is corrected such that the vertical zone with the largest amount of received light becomes the center of the scan area in the vertical direction, an optimal setting of the optical axis becomes possible even when the optical axis swings momentarily for a few seconds, say, due to the swinging motion of the own vehicle in the vertical direction at the time of its acceleration or the displacement of the front-running vehicle in the vertical direction because of the sloped condition of the road. This makes is possible to correctly measure the distance to the target object of detection. Since the so-called filtering and clipping processes are carried out, furthermore, the unwanted effects of instantaneous deviation of the optical axis on the quantity of received light and hence more appropriate correction values can be obtained according to this invention.

Even in the case where there is no target object of detection, it is possible according to this invention to determine a correction value for the optical axis by using a histogram of earlier obtained correction values and their frequencies. This makes it possible to make corrections for long-term deviation of the optical axis, say, due to the sloping of the own vehicle due to its load condition or a light collision.

In the description above, it is to be reminded that the direction of the "optical axis" means the vertical direction indicative of the center of the range of scan, not the frontal direction in which the laser radar physically faces.

Although the invention has been described above for a case of detecting a vehicle, this is not intended to limit the scope of the invention. It goes without saying that this invention can be applied to the detection of obstacles and other objects. It also goes without saying that the steps for carrying out various processes described above need not be carried out in the same time sequence as described but may be carried out in parallel concurrently or individually.

In summary, the merits of the present invention are that it makes it possible to detect objects accurately and to correct the optical axis of the emitted electromagnetic waves appropriately even if there is currently no object in front.

What is claimed is:

1. An object detecting device for emitting electromagnetic waves in a forward direction and detecting an object from reflected waves of said emitted electromagnetic waves; said object detecting device comprising:
   emitting means for emitting said electromagnetic waves by scanning a scan range in horizontal and vertical directions;
   receiving means for receiving said reflected waves;
   level obtaining means for obtaining level of said reflected waves received by said receiving means;
   calculating means for calculating a first correction value based on vertical position of a zone in said scan range where the level of said received waves is the highest and the center position of said scan range in the vertical direction; and
   correcting means for correcting the center position in the vertical direction of said scan range based on said first correction value calculated by said calculating means.

2. The object detecting device of claim 1 further comprising first storing means for storing said first correction value for each scan of said scan range, said calculating means calculating a next first correction value according to a previous first correction value calculated previously by said calculating means and stored in said first memory means.

3. The object detecting device of claim 2 wherein said calculating means sets said next first correction value, equal to the sum of said previous first correction value and a specified value if the difference between said previous first correction value stored in said first memory means and said next first correction value is equal to or greater than said specified value.

4. The object detecting device of claim 1 further comprising a histogram storing means for storing a histogram of first correction values calculated by said calculating means and frequency numbers of corrections effected by said correcting means, wherein, when the first correction value calculated by said calculating means satisfies specified conditions, one is added to the frequency number in said histogram corresponding to the first correction value calculated by said calculating means.

5. The object detecting device of claim 1 installed on a vehicle, wherein said conditions include that the distance between said vehicle and said object as measured by said object detecting device be within a specified range, that the absolute value of said first correction value be less than a specified maximum value and that the speed of said vehicle be greater than a specified minimum speed.

6. The object detecting device of claim 4 further comprising:
   first judging means for judging whether or not said object has been detected by said object detecting device;
   second judging means for judging, when said first judging means judges that said object has not been detected, whether data number of said histogram is larger than a standard data number or not; and
   setting means for setting the first correction value of the histogram having the largest of said frequency numbers, when said second judging means judges that the data number of said histogram is larger than said standard data number, as second correction value;
   wherein said correcting means corrects the center position in the vertical direction of said scan range based further on said second correction value.

7. The object detecting device of claim 6 further comprising:
   second storing means for storing said second correction value; and
   third judging means for judging whether or not said second storing means is storing said second correction value;
   wherein said correcting means corrects the center position in the vertical direction of said scan range based on said second correction value if said third judging means judges that said second storing means is storing said second correction value.

8. The object detecting device of claim 6 wherein said correcting means corrects the center position in the vertical direction of said scan range based on a preliminarily set standard correction value if said third judging means judges that said second storing means is not storing said second correction value.

9. A method of detecting an object; said method comprising the steps of:

emitting electromagnetic waves in a forward direction by scanning a scan range in horizontal and vertical directions;

receiving reflected waves of said electromagnetic waves;

obtaining level of said reflected waves received in the step of receiving;

calculating a first correction value based on vertical position of a zone in said scan range where the level of said received waves is the highest and the center position of said scan range in the vertical direction; and correcting the center position in the vertical direction of said scan range based on said first correction value calculated in the step of calculating.

* * * * *